US010638495B2

(12) United States Patent
Aiba et al.

(10) Patent No.: US 10,638,495 B2
(45) Date of Patent: Apr. 28, 2020

(54) TERMINAL APPARATUS, BASE STATION APPARATUS, AND INTEGRATED CIRCUIT

(71) Applicant: Sharp Kabushiki Kaisha, Sakai, Osaka (JP)

(72) Inventors: Tatsushi Aiba, Sakai (JP); Shoichi Suzuki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/857,689

(22) Filed: Dec. 29, 2017

(65) Prior Publication Data

US 2018/0146486 A1  May 24, 2018

Related U.S. Application Data

(63) Continuation of application No. 15/394,877, filed on Dec. 30, 2016, now Pat. No. 9,894,673, which is a (Continued)

(30) Foreign Application Priority Data

Mar. 14, 2012 (JP) ................................. 2012-056893

(51) Int. Cl.
*H04W 72/12* (2009.01)
*H04L 1/18* (2006.01)
(Continued)

(52) U.S. Cl.
CPC .......... *H04W 72/121* (2013.01); *H04B 1/713* (2013.01); *H04B 1/7103* (2013.01);
(Continued)

(58) Field of Classification Search
CPC ......... H04B 1/7103; H04B 1/713; H04L 5/00; H04L 5/0051; H04L 27/2613;
(Continued)

(56) References Cited

U.S. PATENT DOCUMENTS 9,065,585 B2 *  6/2015  Noh .................... H04L 27/2613
9,270,356 B2 *  2/2016  Chung ................ H04B 7/0684
(Continued)

FOREIGN PATENT DOCUMENTS

WO  2011/155711 A2  12/2011

OTHER PUBLICATIONS

Aiba et al., "Terminal Apparatus, Base Station Apparatus, and Integrated Circuit", U.S. Appl. No. 15/394,877, filed Dec. 30, 2016.

Primary Examiner — Brian D Nguyen
(74) Attorney, Agent, or Firm — Keating & Bennett, LLP

(57) ABSTRACT

A terminal apparatus, a base station apparatus, a communication method, an integrated circuit, and a radio communication system are provided that enable a base station apparatus and a terminal apparatus to determine parameters relating to an uplink reference signal and efficiently communicate with each other. A terminal apparatus that transmits a demodulation reference signal, the terminal apparatus comprising: means for receiving a cell-specific parameter used for enabling or disabling a sequence group hopping, means for a user-equipment-specific parameter used for disabling the sequence group hopping, and means for generating a sequence of the demodulation reference signal on the basis of the enabled or disabled sequence group hopping, wherein, in a case that a transmission on the physical uplink shared channel corresponding to a downlink control information format to which CRC parity bits scrambled by a temporary C-RNTI are attached, the sequence group hopping is enabled or disabled on the basis of the cell-specific parameter.

16 Claims, 5 Drawing Sheets

Related U.S. Application Data continuation of application No. 14/384,536, filed as application No. PCT/JP2013/057008 on Mar. 13, 2013, now Pat. No. 9,553,633.

(51) Int. Cl.

| | | |
|---|---|---|
| *H04L 5/00* | (2006.01) | |
| *H04W 72/04* | (2009.01) | |
| *H04J 13/00* | (2011.01) | |
| *H04L 27/26* | (2006.01) | |
| *H04B 1/7103* | (2011.01) | |
| *H04B 1/713* | (2011.01) | |

(52) U.S. Cl.
CPC ........ *H04J 13/0074* (2013.01); *H04L 1/1887* (2013.01); *H04L 5/00* (2013.01); *H04L 5/0012* (2013.01); *H04L 5/0051* (2013.01); *H04L 27/2613* (2013.01); *H04W 72/042* (2013.01); *H04W 72/0413* (2013.01)

(58) Field of Classification Search
CPC ............... H04L 5/0012; H04L 1/1887; H04W 72/0413; H04W 72/042; H04W 72/121; H04J 13/0074

See application file for complete search history.

(56) References Cited

U.S. PATENT DOCUMENTS

| | | | |
|---|---|---|---|
| 2011/0200143 A1* | 8/2011 | Koo ..................... | H04B 7/0697 375/299 |
| 2011/0206089 A1* | 8/2011 | Cho ..................... | H04W 72/042 375/141 |
| 2011/0268087 A1* | 11/2011 | Kwon ................... | H04L 5/0005 370/331 |
| 2011/0317745 A1 | 12/2011 | Okubo et al. | |
| 2012/0014349 A1* | 1/2012 | Chung ................ | H04B 7/0684 370/329 |
| 2013/0039285 A1* | 2/2013 | Sorrentino ........... | H04L 5/0091 370/329 |
| 2013/0128821 A1* | 5/2013 | Hooli ................... | H04L 5/0051 370/329 |
| 2014/0247799 A1 | 9/2014 | Suzuki et al. | |

\* cited by examiner

TERMINAL APPARATUS, BASE STATION APPARATUS, AND INTEGRATED CIRCUIT

TECHNICAL FIELD

The present invention relates to a terminal apparatus, a base station apparatus, a communication method, an integrated circuit, and a radio communication system.

BACKGROUND ART

In a radio communication system such as LTE (Long-Term Evolution) or LTE-A (LTE-Advanced) developed by the 3GPP (Third Generation Partnership Project) or WiMAX (Worldwide Interoperability for Microwave Access) developed by the IEEE (Institute of Electrical and Electronics Engineers), a base station and a terminal each include one or a plurality of transmission and reception antennas and can realize high-speed data communication using, for example, a MIMO (multiple input multiple output) technique.

Here, in radio communication systems, it is being examined to support MU-MIMO (multiple user MIMO), in which a plurality of terminals perform spatial multiplexing using the same frequency and time resources. In addition, it is being examined to support a CoMP (cooperative multipoint) communication scheme, in which a plurality of base stations cooperatively perform interference coordination. For example, a radio communication system is being examined that adopts a heterogeneous network deployment (HetNet) realized by a macro base station having wide coverage and an RRH (remote radio head) having coverage narrower than that of the macro base station.

In such a radio communication system, if uplink reference signals transmitted by a plurality of terminals have the same characteristics, interference occurs. Here, for example, a method has been proposed for orthogonalizing demodulation reference signals (DMRSs) transmitted by the plurality of terminals to one another in order to reduce or suppress interference between the demodulation reference signals (NPL 1).

CITATION LIST

Non Patent Literature

NPL 1: DMRS enhancements for UL CoMP; 3GPP TSG RAN WG1 meeting #68 R1-120277, Feb. 6-10, 2012.

SUMMARY OF INVENTION

Technical Problem

With respect to radio communication systems, however, there has been no description regarding a specific procedure used by a base station and a terminal for determining parameters relating to an uplink reference signal. That is, there has been no description regarding how a base station and a terminal determine the parameters relating to the uplink reference signal and communicate with each other.

The present invention has been established in view of the above problem, and an object thereof is to provide a base station apparatus, a terminal apparatus, a communication method, an integrated circuit, and a communication system that enable a base station and a terminal to determine parameters relating to an uplink reference signal and efficiently communicate with each other.

Solution to Problem (1) In order to achieve the above object, the present invention takes the following measures. That is, a terminal apparatus that transmits a demodulation reference signal associated with a physical uplink shared channel to a base station apparatus, the terminal apparatus comprising: means for receiving, from the base station apparatus, a cell-specific parameter used for enabling or disabling a sequence group hopping, means for receiving, from the base station apparatus, a user-equipment-specific parameter used for disabling the sequence group hopping, and means for generating a sequence of the demodulation reference signal on the basis of the enabled or disabled sequence group hopping, wherein, in a case that a transmission on the physical uplink shared channel corresponding to a downlink control information format to which CRC parity bits scrambled by a temporary C-RNTI are attached is performed in a random access procedure, the sequence group hopping is enabled or disabled on the basis of the cell-specific parameter regardless of the user-equipment-specific parameter.

(2) In addition, a terminal apparatus that transmits a demodulation reference signal associated with a physical uplink shared channel to a base station apparatus, the terminal apparatus comprising: means for receiving, from the base station apparatus, a cell-specific parameter used for enabling or disabling a sequence group hopping, means for receiving, from the base station apparatus, a user-equipment-specific parameter used for disabling the sequence group hopping, and means for generating a sequence of the demodulation reference signal on the basis of the enabled or disabled sequence group hopping, wherein, in a case that a transmission of a Message 3 on the physical uplink shared channel corresponding to a random access response grant is performed in a random access procedure, the sequence group hopping is enabled or disabled on the basis of the cell-specific parameter regardless of the user-equipment-specific parameter.

(3) In addition, a terminal apparatus that transmits a demodulation reference signal associated with a physical uplink shared channel to a base station apparatus, the terminal apparatus comprising; means for receiving, from the base station apparatus, a cell-specific parameter used for enabling or disabling a sequence group hopping, means for receiving, from the base station apparatus, a user-equipment-specific parameter used for disabling the sequence group hopping, and means for generating a sequence of the demodulation reference signal on the basis of the enabled or disabled sequence group hopping, wherein the sequence group hopping is disabled on the basis of the user-equipment-specific parameter regardless of the cell-specific parameter, unless a transmission of a Message 3 is on the physical uplink shared channels corresponding to a downlink control information format to which CRC parity bits scrambled by a temporary C-RNTI are attached or on the physical uplink shared channel corresponding to a random access response grant is performed in a random access procedure.

(4) In addition, a base station apparatus that receives a demodulation reference signal associated with a physical uplink shared channel from a terminal apparatus, a sequence of the demodulation reference signal being generated on the basis of enabled or disabled sequence group hopping, the base station apparatus comprising: means for transmitting, to the terminal apparatus, a cell-specific parameter used for enabling or disabling the sequence group hopping, and means for transmitting, to the terminal apparatus, a userequipment-specific parameter used for disabling the sequence group hopping, wherein, in a case that a downlink control information format to which CRC parity bits scrambled by a temporary C-RNTI are attached is used for scheduling for a transmission on the physical uplink shared channel in a random access procedure, the sequence group hopping is enabled or disabled on the basis of the cell-specific parameter regardless of the user-equipment-specific parameter.

(5) In addition, a base station apparatus that receives a demodulation reference signal associated with a physical uplink shared channel from a terminal apparatus, a sequence of the demodulation reference signal being generated on the basis of enabled or disabled sequence group hopping, the base station apparatus comprising: means for transmitting, to the terminal apparatus, a cell-specific parameter used for enabling or disabling the sequence group hopping, and means for transmitting, to the terminal apparatus, a user-equipment-specific parameter used for disabling the sequence group hopping, wherein, in a case that a random access response grant is used for scheduling for a transmission of a Message 3 on the physical uplink shared channel in a random access procedure, the sequence group hopping is enabled or disabled on the basis of the cell-specific parameter regardless of the user-equipment-specific parameter.

(6) In addition, a base station apparatus that receives a demodulation reference signal associated with a physical uplink shared channel from a terminal apparatus, a sequence of the demodulation reference signal being generated on the basis of enabled or disabled sequence group hopping, the base station apparatus comprising: means for transmitting, to the terminal apparatus, a cell-specific parameter used for enabling or disabling the sequence group hopping, and means for transmitting, to the terminal apparatus, a user-equipment-specific parameter used for disabling the sequence group hopping, wherein the sequence group hopping is disabled on the basis of the user-equipment-specific parameter regardless of the cell-specific parameter, unless a downlink information format to which CRC parity bits scrambled by a temporary C-RNTI are attached or a random access response grant is used for scheduling for a transmission of a Message 3 on the physical uplink shared channels in a random access procedure.

(7) In addition, an integrated circuit mounted on a terminal apparatus that transmits a demodulation reference signal associated with a physical uplink shared channel to a base station apparatus, the integrated circuit causing the terminal apparatus causing the terminal apparatus to realize: a function of receiving, from the base station apparatus, a cell-specific parameter used for enabling or disabling a sequence group hopping, a function of receiving, from the base station apparatus, a user-equipment-specific parameter used for disabling the sequence group hopping, a function of generating a sequence of the demodulation reference signals on the basis of the enabled or disabled sequence group hopping, and a function of enabling or disabling, in a case that a transmission on the physical uplink shared channel corresponding to a downlink control information format to which CRC parity bits scrambled by a temporary C-RNTI are attached is performed in a random access procedure, the sequence group hopping on the basis of the cell-specific parameter regardless of the user-equipment-specific parameter.

(8) In addition, an integrated circuit mounted on a terminal apparatus that transmits a demodulation reference signal associated with a physical uplink shared channel to a base station apparatus, the integrated circuit causing the terminal apparatus causing the terminal apparatus to realize a function of receiving, from the base station apparatus, a cell-specific parameter used for enabling or disabling a sequence group hopping, a function of receiving, from the base station apparatus, a user-equipment-specific parameter used for disabling the sequence group hopping, a function of generating a sequence of the demodulation reference signal on the basis of the enabled or disabled sequence group hopping, and a function of enabling or disabling, in a case that a transmission of a Message 3 on the physical uplink shared channel corresponding to a random access response grant is performed in a random access procedure, the sequence group hopping on the basis of the cell-specific parameter regardless of the user-equipment-specific parameter.

(9) In addition, an integrated circuit mounted on a terminal apparatus that transmits a demodulation reference signal associated with a physical uplink shared channel to a base station apparatus, the integrated circuit causing the terminal apparatus to realize a function of receiving, from the base station apparatus, a cell-specific parameter used for enabling or disabling a sequence group hopping, a function of receiving, from the base station apparatus, a user-equipment-specific parameter used for disabling the sequence group hopping, a function of generating a sequence of the demodulation reference signal on the basis of the enabled or disabled sequence group hopping, and a function of disabling the sequence group hopping on the basis of the user-equipment-specific parameter regardless of the cell-specific parameter, unless a transmission of a Message 3 on the physical uplink shared channel corresponding to a downlink control information format to which CRC parity bits scrambled by a temporary C-RNTI are attached or on the physical uplink shared channel corresponding to a random access response grant in a random access procedure.

(10) An integrated circuit mounted on a base station apparatus that receives a demodulation reference signal associated with a physical uplink shared channel from a terminal apparatus, a sequence of the demodulation reference signal being generated on the basis of enabled or disabled a sequence group hopping, the integrated circuit causing the base station apparatus to realize a function of transmitting, to the terminal apparatus, a cell-specific parameter used for enabling or disabling the sequence group hopping, a function of transmitting, to the terminal apparatus, a user-equipment-specific parameter used for disabling the sequence group hopping, and a function of enabling or disabling, in a case that a downlink control information format to which CRC parity bits scrambled by a temporary C-RNTI are attached is used for scheduling for a transmission on the physical uplink shared channel in a random access procedure, the sequence group hopping on the basis of the cell-specific parameter regardless of the user-equipment-specific parameter.

(11) An integrated circuit mounted on a base station apparatus that receives a demodulation reference signal associated with a physical uplink shared channel from a terminal apparatus, a sequence of the demodulation reference signal being generated on the basis of enabled or disabled sequence group hopping, the integrated circuit causing the base station apparatus to realize a function of transmitting, to the terminal apparatus, a cell-specific parameter used for enabling or disabling the sequence group hopping, a function of transmitting, to the terminal apparatus, a user-equipment-specific parameter used for disabling the sequence group hopping, a function of enabling or disabling, in a case that a random access response grant is used for scheduling for a transmission of a Message 3 on the physical uplink shared channel, the sequence group hopping on the basis of the cell-specific parameter regardless of the user-equipment-specific parameter.

(12) In addition, an integrated circuit mounted on a base station apparatus that receives a demodulation reference signal associated with a physical uplink shared channel from a terminal apparatus, a sequence of the demodulation reference signal being generated on the basis of enabled or disabled sequence group hopping, the integrated circuit causing the base station apparatus to realize a function of transmitting, to the terminal apparatus, a cell-specific parameter used for enabling or disabling the sequence group hopping, a function of transmitting, to the terminal apparatus, a user-equipment-specific parameter used for disabling the sequence group hopping, and a function of disabling the sequence group hopping on the basis of the user-equipment-specific parameter regardless of the cell-specific parameter, unless a downlink information format to which CRC parity bits scrambled by a temporary C-RNTI are attached or a random access response grant is used for scheduling for a transmission of a Message 3 on the physical uplink shared channels in a random access procedure. Advantageous Effects of Invention According to the present invention, a base station and a terminal can determine parameters relating to an uplink reference signal and efficiently communicate with each other.

DESCRIPTION OF EMBODIMENTS

An embodiment of the present invention will be described hereinafter. A radio communication system according to the embodiment of the present invention includes a primary base station (also referred to as a macro base station, a first base station, a first communication apparatus, a serving base station, an anchor base station, or a primary cell) and a secondary base station (also referred to as an RRH, a pico base station, a femto base station, a Home eNodeB, a second base station apparatus, a second communication apparatus, cooperative base stations, a cooperative base station set, a cooperative base station, or a secondary cell) as base station apparatuses (hereinafter also referred to as base stations, transmission apparatuses, cells, serving cells, transmission stations, transmission points, transmission antennas, transmission antenna ports, or eNodeBs). In addition, a mobile station apparatus (hereinafter also referred to as a terminal, a terminal apparatus, a mobile terminal, a reception apparatus, a reception point, a reception terminal, a third communication apparatus, reception antennas, reception antenna ports, or user equipment (UE)) is also included.

Here, the secondary base station may be a plurality of secondary base stations. For example, the primary base station and the secondary base station adopt heterogeneous network deployment, in which part or all of the coverage of the secondary base station is included in the coverage of the primary base station, in order to communicate with the terminal.

Figure 1:
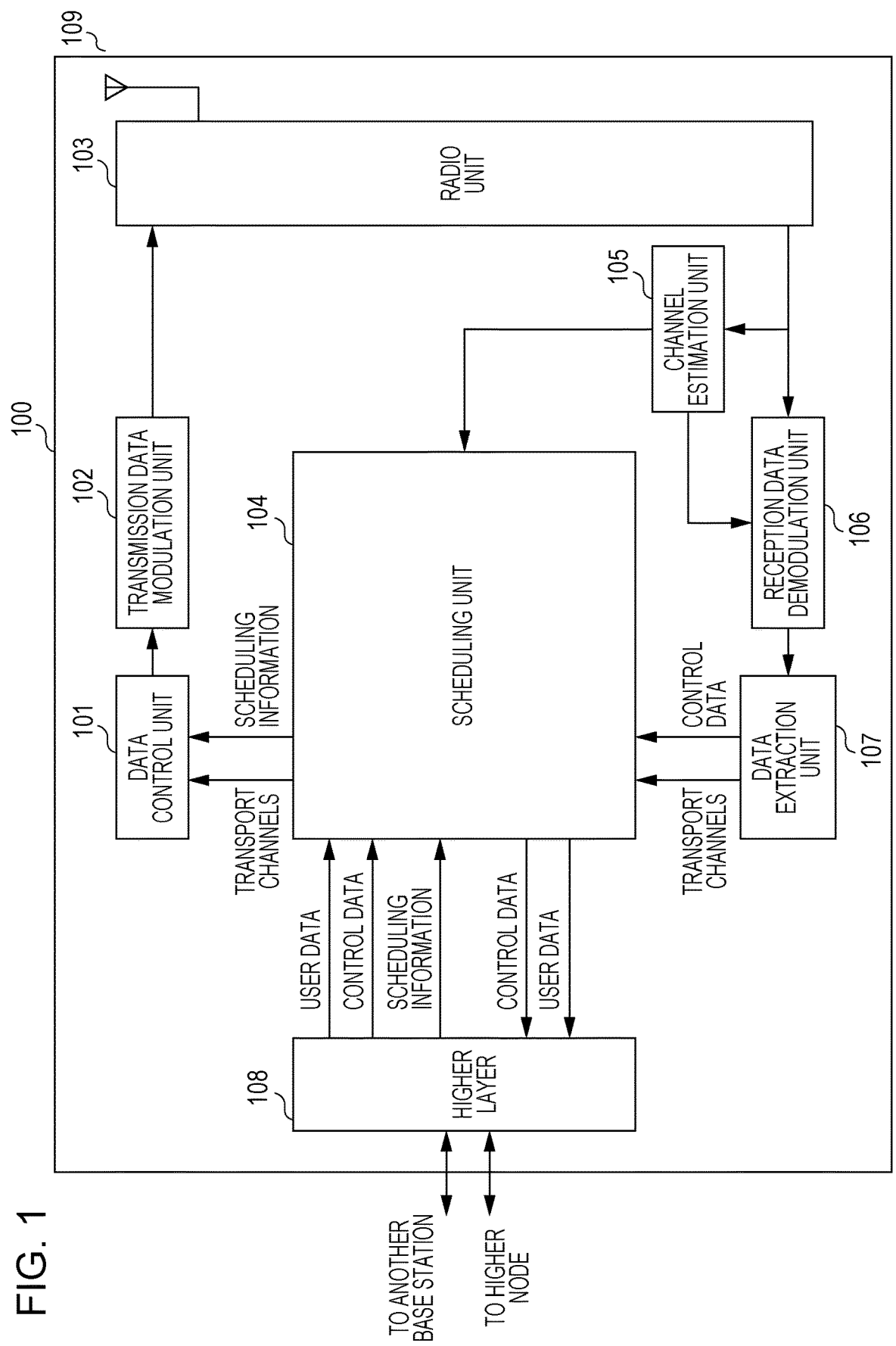
FIG. 1 is a schematic block diagram illustrating the configuration of a base station according to an embodiment of the present invention.

FIG. 1 is a schematic block diagram illustrating the configuration of the base station according to the embodiment of the present invention. Here, the base station illustrated in FIG. 1 may be a primary base station or a secondary base station. The base station is configured by including a data control unit 101, a transmission data modulation unit 102, a radio unit 103, a scheduling unit 104, a channel estimation unit 105, a reception data demodulation unit 106, a data extraction unit 107, a higher layer 108, and an antenna 109. In addition, the radio unit 103, the scheduling unit 104, the channel estimation unit 105, the reception data demodulation unit 106, the data extraction unit 107, the higher layer 108, and the antenna 109 configure a reception section. In addition, the data control unit 101, the transmission data modulation unit 102, the radio unit 103, the scheduling unit 104, the higher layer 108, and the antenna 109 configure a transmission section. Here, each component configuring the base station will also be referred to as a unit.

The data control unit 101 receives transport channels from the scheduling unit 104. The data control unit 101 maps the transport channels and signals generated in a physical layer in physical channels on the basis of scheduling information input from the scheduling unit 104. Each piece of data mapped is output to the transmission data modulation unit 102.

The transmission data modulation unit 102 modulates and encodes transmission data. The transmission data modulation unit 102 generates the transmission data by performing signal processing, such as modulation, encoding, serial-to-parallel conversion of input signals, an IFFT (inverse Fast Fourier transform) process, and CP (cyclic prefix) insertion, on the data input from the data control unit 101 on the basis of the scheduling information from the scheduling unit 104 or the like. The transmission data modulation unit 102 then outputs the generated transmission data to the radio unit 103.

The radio unit 103 up-converts the transmission data input from the transmission data modulation unit 102 into radio frequencies to generate radio signals and transmits the radio signals to the terminal through the antenna 109. In addition, the radio unit 103 receives radio signals from the terminal through the antenna 109. The radio unit 103 then down-converts the radio signals into baseband signals and outputs reception data to the channel estimation unit 105 and the reception data demodulation unit 106.

The scheduling unit 104, for example, maps logical channels and transport channels and performs downlink and uplink scheduling. The scheduling unit 104 includes interfaces between the scheduling unit 104 and the antenna 109, the radio unit 103, the channel estimation unit 105, the reception data demodulation unit 106, the data control unit 101, the transmission data modulation unit 102, and the data extraction unit 107, in order to integrally control processing units in the physical layers.

In addition, in the downlink scheduling, the scheduling unit 104 performs transmission control in the transport channels and the physical channels and generates scheduling information on the basis of uplink control information received from the terminal, scheduling information input from the higher layer 108, and the like. The scheduling information used for the downlink scheduling is output to the data control unit 101.

In addition, in the uplink scheduling, the scheduling unit 104 generates scheduling information on the basis of an uplink channel state output from the channel estimation unit 105, the scheduling information input from the higher layer 108, and the like. The scheduling information used for the uplink scheduling is output to the data control unit 101.

In addition, the scheduling unit 104 maps downlink logical channels input from the higher layer 108 in the transport channels and outputs the transport channels to the data control unit 101. In addition, the scheduling unit 104 maps uplink transport channels and control data input from the data extraction unit 107 in uplink logical channels after processing the uplink transport channels and the control data as necessary, and then outputs the uplink logical channels to the higher layer 108.

The channel estimation unit 105 estimates the uplink channel state on the basis of uplink reference signals (for example, the demodulation reference signal) in order to demodulate uplink data, and then outputs the uplink channel state to the reception data demodulation unit 106. In addition, the channel estimation unit 105 estimates the uplink channel state on the basis of uplink reference signals (for example, a sounding reference signal) in order to perform the uplink scheduling, and then outputs the uplink channel state to the scheduling unit 104.

The reception data demodulation unit 106 demodulates reception data. The reception data demodulation unit 106 performs a demodulation process on the modulated data input from the radio unit 103 by performing signal processing, such as a DFT transform, subcarrier mapping, and an IFFT transform, on the basis of a result of the estimation of the uplink channel state input from the channel estimation unit 105. The reception data demodulation unit 106 then outputs the modulated data to the data extraction unit 107.

The data extraction unit 107 checks whether the reception data input from the reception data demodulation unit 106 is correct and outputs a result (for example, ACK or NACK) of the check to the scheduling unit 104. In addition, the data extraction unit 107 divides the data input from the reception data demodulation unit 106 into transport channels and control data in the physical layer and outputs the transport channels and the control data in the physical layer to the scheduling unit 104.

The higher layer 108 performs processing in a radio resource control (RRC) layer and processing in a MAC (media access control) layer. The higher layer 108 includes interfaces between the higher layer 108 and the scheduling unit 104, the antenna 109, the radio unit 103, the channel estimation unit 105, the reception data demodulation unit 106, the data control unit 101, the transmission data modulation unit 102, and the data extraction unit 107, in order to integrally control processing units in a lower layer.

Figure 2:
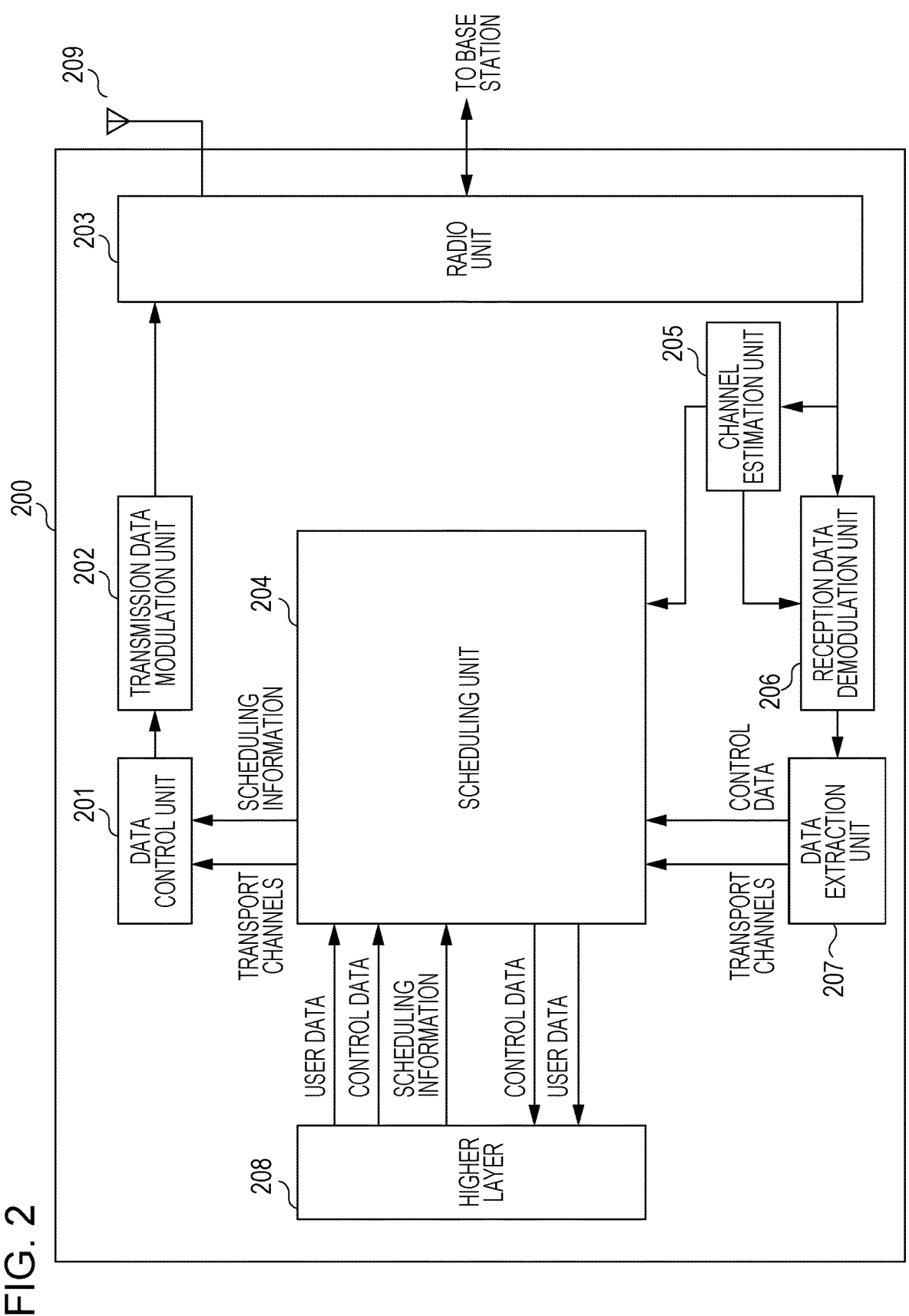
FIG. 2 is a schematic block diagram illustrating the configuration of a terminal according to the embodiment of the present invention.

FIG. 2 is a schematic block diagram illustrating the configuration of the terminal according to the embodiment of the present invention. The terminal is configured by including a data control unit 201, a transmission data modulation unit 202, a radio unit 203, a scheduling unit 204, a channel estimation unit 205, a reception data demodulation unit 206, a data extraction unit 207, a higher layer 208, and an antenna 209. In addition, the data control unit 201, the transmission data modulation unit 202, the radio unit 203, the scheduling unit 204, the higher layer 208, and the antenna 209 configure a transmission section. In addition, the radio unit 203, the scheduling unit 204, the channel estimation unit 205, the reception data demodulation unit 206, the data extraction unit 207, the higher layer 208, and the antenna 209 configure a reception section. Here, each component configuring the terminal will also be referred to as a unit.

The data control unit 201 receives transport channels from the scheduling unit 204. In addition, the data control unit 201 maps the transport channels and signals generated in the physical layer in physical channels on the basis of scheduling information input from the scheduling unit 204. Each piece of data mapped is output to the transmission data modulation unit 202.

The transmission data modulation unit 202 modulates and encodes transmission data. The transmission data modulation unit 202 generates the transmission data by performing signal processing, such as modulation, encoding, serial-to-parallel conversion of input signals, an IFFT process, and CP insertion, on the data input from the data control unit 201 and outputs the generated transmission data to the radio unit 203.

The radio unit 203 up-converts the transmission data input from the transmission data modulation unit 202 into radio frequencies to generate radio signals and transmits the radio signals to the terminal through the antenna 209. In addition, the radio unit 203 receives radio signals from the base station through the antenna 209. The radio unit 203 then down-converts the radio signals into baseband signals and outputs reception data to the channel estimation unit 205 and the reception data demodulation unit 206.

The scheduling unit 204, for example, maps logical channels and transport channels and performs downlink and uplink scheduling. The scheduling unit 204 includes interfaces between the scheduling unit 204 and the antenna 209, the data control unit 201, the transmission data modulation unit 202, the channel estimation unit 205, the reception data demodulation unit 206, the data extraction unit 207, and the radio unit 203, in order to integrally control processing units in the physical layer.

In addition, in the downlink scheduling, the scheduling unit 204 performs reception control in the transport channels and the physical channels and generates scheduling information on the basis of downlink control information received from the base station, scheduling information input from the higher layer 208, and the like. The scheduling information used for the downlink scheduling is output to the data control unit 201.

In addition, in the uplink scheduling, the scheduling unit 204 performs a scheduling process for mapping the uplink logical channels input from the higher layer 208 in the transport channels and generates scheduling information used for the uplink scheduling on the basis of downlink control information received from the base station, the scheduling information input from the higher layer 208, and the like. The scheduling information is output to the data control unit 201.

In addition, the scheduling unit 204 maps uplink logical channels input from the higher layer 208 in the transport channels and outputs the transport channels to the data control unit 201. In addition, the scheduling unit 204 outputs, to the data control unit 201, channel state information input from the channel estimation unit 205 and a result of a check of CRC (cyclic redundancy check) parity bits (also referred to simply as a CRC) input from the data extraction unit 207.

In addition, the scheduling unit 204 determines parameters relating to the uplink reference signal and generates the uplink reference signal using the determined parameters.

That is, the scheduling unit 204 generates the uplink reference signal on the basis of enabled or disabled sequence group hopping. In addition, the scheduling unit 204 generates the uplink reference signal on the basis of enabled or disabled sequence hopping.

The channel estimation unit 205 estimates a downlink channel state on the basis of downlink reference signals (for example, the demodulation reference signal) in order to demodulate downlink data, and then outputs the downlink channel state to the reception data demodulation unit 206. In addition, the reception data demodulation unit 206 demodulates the reception data input from the radio unit 203 and outputs the demodulated reception data to the data extraction unit 207.

The data extraction unit 207 checks whether the reception data input from the reception data demodulation unit 206 is correct and outputs a result (for example, ACK or NACK) of the check to the scheduling unit 204. In addition, the data extraction unit 207 divides the reception data input from the reception data demodulation unit 206 into transport channels and control data in the physical layer and outputs the transport channels and the control data in the physical layer to the scheduling unit 204.

The higher layer 208 performs processing in the radio resource control layer and processing in the MAC layer. The higher layer 208 includes interfaces between the higher layer 208 and the scheduling unit 204, the antenna 209, the data control unit 201, the transmission data modulation unit 202, the channel estimation unit 205, the reception data demodulation unit 206, the data extraction unit 207, and the radio unit 203, in order to integrally control processing units in the lower layer.

Figure 3:
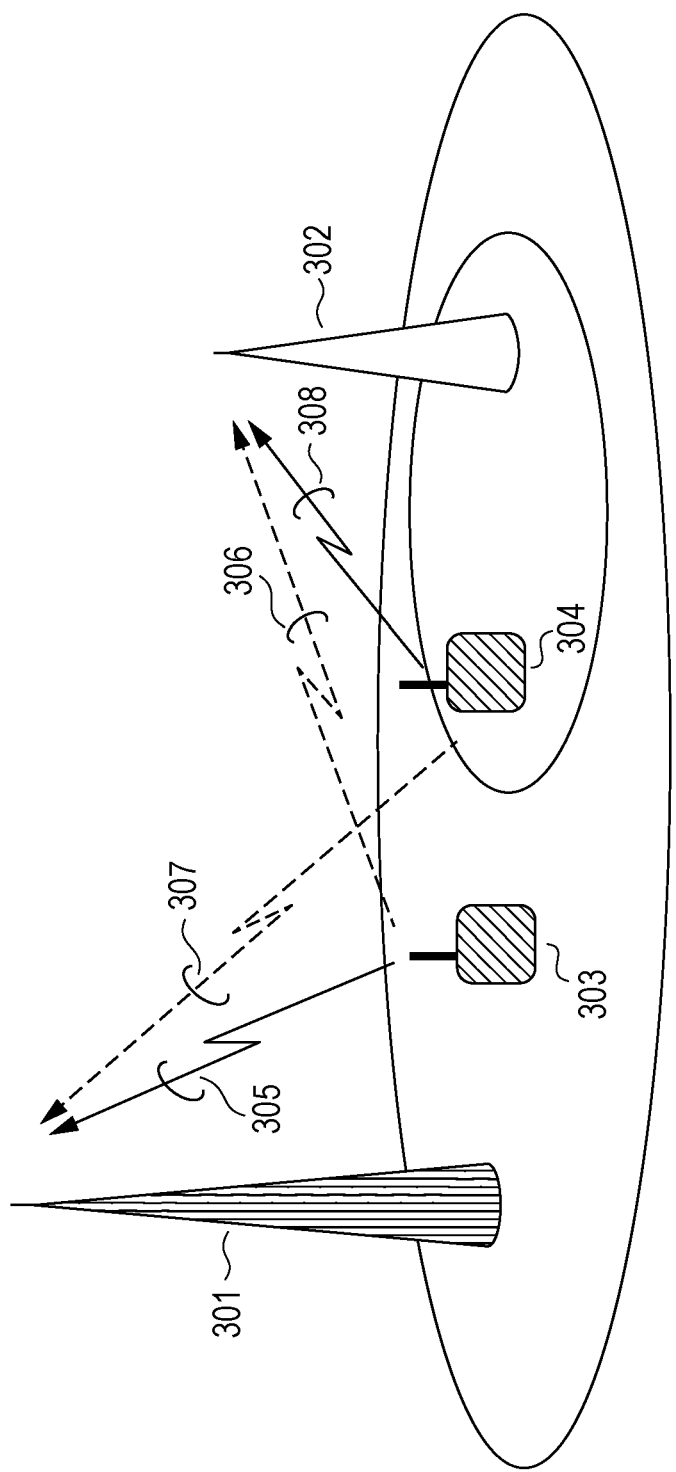
FIG. 3 is a schematic diagram illustrating an example of communication according to the embodiment of the present invention.

FIG. 3 is a schematic diagram illustrating an example of communication according to the embodiment of the present invention. In FIG. 3, a terminal 303 communicates with a primary base station 301 and/or a second base station 302. In addition, a terminal 304 communicates with the primary base station 301 and/or the secondary base station 302.

In FIG. 3, when transmitting an uplink signal to the base station, the terminal multiplexes the demodulation reference signal (DMRS), which is a signal known between the base station and the terminal, with the uplink signal and transmits the uplink signal. Here, the uplink signal includes uplink data (an uplink shared channel (UL-SCH) or an uplink transport block). In addition, the uplink signal includes uplink control information (UCI). Here, the UL-SCH is a transport channel.

For example, the uplink data is mapped to a physical uplink shared channel (PUSCH). In addition, the uplink control information is mapped to the PUSCH or a physical uplink control channel (PUCCH). That is, in the radio communication system, a demodulation reference signal associated with transmission of the PUSCH (transmission on the PUSCH) are supported. The demodulation reference signal associated with the transmission of the PUSCH will also be referred to as a first reference signal.

In addition, a random access preamble is mapped to a physical random access channel (PRACH). When transmitting the random access preamble to the base station apparatus, the terminal transmits the random access preamble without multiplexing the demodulation reference signal.

That is, the first reference signal is used for demodulating the PUSCH. For example, the first reference signal is transmitted in a resource block (also referred to as a physical resource block, a physical resource, or a resource) to which a corresponding PUSCH is mapped.

That is, the terminal 303 multiplexes the first reference signal with the uplink signal to be transmitted to the primary base station 301 and transmits the uplink signal to be through an uplink 305. In addition, the terminal 303 multiplexes the first reference signal with the uplink signal transmitted to the secondary base station 302 and transmits the uplink signal through an uplink 306. In addition, the terminal 304 multiplexes the first reference signal with the uplink signal to be transmitted to the primary base station 301 and transmits the uplink signal through an uplink 307. In addition, the terminal 304 multiplexes the first reference signal with the uplink signal to be transmitted to the secondary base station 302 and transmits the uplink signal through an uplink 308.

Here, if the first reference signal transmitted from the terminal 303 and the first reference signal transmitted from the terminal 304 have the same characteristics, interference undesirably occurs. For example, if interference has occurred between the first reference signals transmitted from a plurality of terminals, an accuracy of estimating the states of channels, which are used for demodulating the uplink signals, significantly decreases.

Therefore, it is desirable to orthogonalize the first reference signal transmitted from the terminal 303 and the first reference signal transmitted from the terminal 304 to each other. In addition, it is desirable to randomize the interference between the first reference signal transmitted from the terminal 303 and the first reference signal transmitted from the terminal 304.

In addition, in FIG. 3, an aggregation of a plurality of serving cells (also referred to simply as cells) is supported in the downlink and the uplink (referred to as a carrier aggregation or a cell aggregation). For example, in each of the serving cells, a transmission bandwidth of up to one hundred and ten resource blocks may be used. Here, in the carrier aggregation, one of the serving cells is defined as a primary cell (Pcell). In addition, in the carrier aggregation, the serving cells other than the primary cell are defined as secondary cells (Scells).

In addition, in the downlink, a carrier corresponding to the serving cell is defined as a downlink component carrier (DLCC). In addition, in the downlink, a carrier corresponding to the primary cell is defined as a downlink primary component carrier (DLPCC). In addition, in the downlink, a carrier corresponding to the secondary cell is defined as a downlink secondary component carrier (DLSCC).

Furthermore, in the uplink, a carrier corresponding to the serving cell is defined as an uplink component carrier (ULCC). In addition, in the uplink, a carrier corresponding to the primary cell is defined as an uplink primary component carrier (ULPCC). In addition, in the uplink, a carrier corresponding to the secondary cell is defined as an uplink secondary component carrier (ULSCC).

That is, in the carrier aggregation, a plurality of component carriers are aggregated in order to support wide transmission bandwidths. Here, for example, the primary base station 301 may be regarded as a primary cell, and the secondary base station 302 may be regarded as a secondary cell (the base station configures to the terminal) (also referred to as HetNet deployment with a carrier aggregation).

Figure 4:
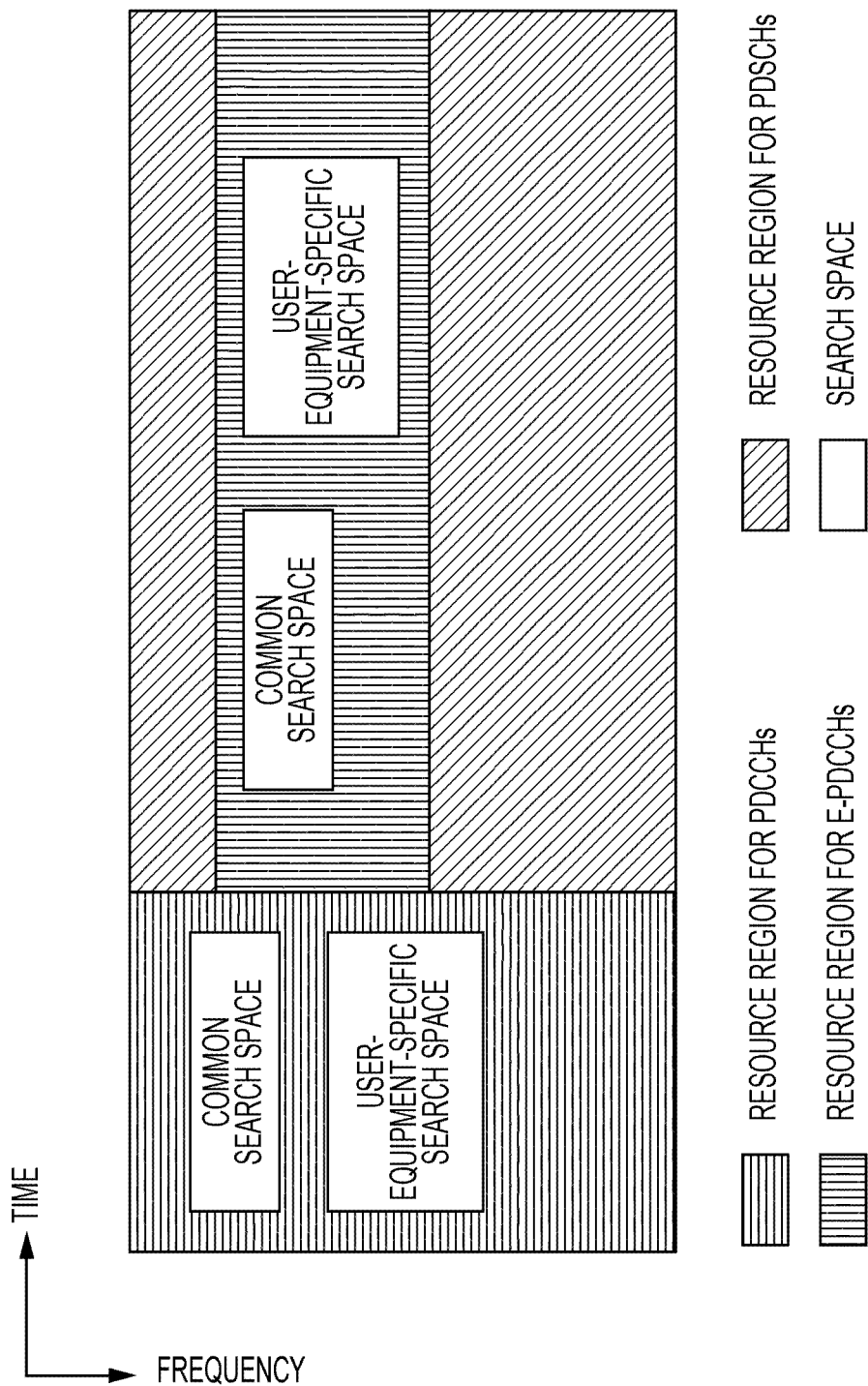
FIG. 4 is a diagram illustrating an example of downlink signals.

FIG. 4 is a diagram illustrating an example of downlink signals. In FIG. 4, a resource region for a physical downlink shared channel (PDSCH) to which downlink data (a downlink shared channel (DL-SCH) or a downlink transport block) is mapped are illustrated. Here, the DL-SCH is a transport channel.

In addition, a resource region for a physical downlink control channel (PDCCH) to which downlink control information (DCI) is mapped is illustrated. In addition, a resource region for an E-PDCCH (an enhanced PDCCH) to which downlink control information is mapped is illustrated.

For example, the PDCCH is mapped to first to third OFDM symbols in a downlink resource region. In addition, the E-PDCCH is mapped to fourth to twelfth OFDM symbols in the downlink resource region. In addition, the E-PDCCH is mapped to a first slot and a second slot in a subframe. In addition, the PDSCH and the E-PDCCH are subjected to FDM (frequency-division multiplexing). In the following description, the E-PDCCH is included in the PDCCH.

Here, the PDCCH is used for notifying (specifying) the downlink control information to the terminal. In addition, a plurality of formats are defined for the downlink control information transmitted on the PDCCH. Here, the formats of the downlink control information will also be referred to as DCI formats.

For example, as DCI formats for the downlink, a DCI Format 1 and a DCI Format 1A, which are used for scheduling of the PDSCH (transmission of a PDSCH codeword and a downlink transport block) in a cell, are defined. In addition, as another DCI format for the downlink, a DCI Format 2, which is used for scheduling of the PDSCH (transmission of up to two PDSCH codewords and up to two downlink transport blocks) in a cell, is defined.

For example, the DCI format for the downlink includes downlink control information such as information regarding a resource assignment of the PDSCH and information regarding an MCS (modulation and coding scheme). A DCI format used for scheduling of the PDSCH will also be referred to as a downlink assignment hereinafter.

In addition, for example, as a DCI format for the uplink, a DCI Format 0, which is used for scheduling of the PUSCH (transmission of a PUSCH codeword and an uplink transport block) in a cell, is defined. In addition, as another DCI format for the uplink, a DCI Format 4, which is used for scheduling of the PUSCH (transmission of up to two PUSCH codewords and up to two uplink transport blocks) in a cell, is defined. That is, the DCI Format 4 is used for scheduling of transmission (transmission mode) on the PUSCH using a plurality of antenna ports.

For example, the DCI format for the uplink includes downlink control information such as information regarding a resource assignment of the PUSCH and information regarding the MCS (modulation and coding scheme). A DCI format used for scheduling of the PUSCH will also be referred to as an uplink grant hereinafter.

In addition, the PDSCH is used for transmitting downlink data. Furthermore, the PDSCH is used for notifying (specifying) a random access response grant to the terminal. Here, the random access response grant is used for scheduling of the PUSCH. Here, the random access response grant is indicated by a higher layer (for example, the MAC layer) to a physical layer.

For example, the base station transmits a random access response that is transmitted as Message 2 in a random access procedure while including the random access response grant in the random access response. In addition, the base station transmits the random access response grant corresponding to Message 1 transmitted from the terminal in the random access procedure. In addition, the base station transmits the random access response grant for transmitting a Message 3 in the random access procedure. That is, the random access response grant may be used for scheduling of the PUSCH for transmitting the Message 3 in the random access procedure.

In FIG. 4, the terminal monitors a set of PDCCH candidates. Here, the PDCCH candidates refer to candidates in which the PDCCHs may possibly be allocated and transmitted by the base station. In addition, the PDCCH candidates are made up of one or a plurality of control channel elements (CCEs). In addition, the monitoring means that the terminal attempts to decode on each of PDCCHs in the set of PDCCH candidates according to all the monitored DCI formats. Here, the set of PDCCH candidates monitored by the terminal will also be referred to as a search space. That is, the search space refers to a set of resources that can be used by the base station for transmitting the PDCCH.

Furthermore, in the resource region for the PDCCH, a common search space (CSS) and a UE-specific search space (USS; a terminal-specific (terminal-unique) search space) are configured (defined or set).

That is, in FIG. 4, the CSS and/or the USS are configured in the resource region for the PDCCH. In addition, the CSS and/or the USS are configured in the resource region for the E-PDCCH. The terminal monitors the PDCCH in the CSS and/or the USS in the resource region for the PDCCH and detects the PDCCH intended therefor. In addition, the terminal monitors the E-PDCCH in the CSS and/or the USS in the resource region for the E-PDCCH and detects the E-PDCCH intended therefor.

Here, the CSS is used for transmitting downlink control information intended for a plurality of terminals. That is, the CSS is defined by a resource common to the plurality of terminals. For example, the CSS is configured by CCEs having numbers predetermined between the base station and the terminal. For example, the CSS is configured by CCEs having indices of 0 to 15, respectively. Here, the CSS may be used for transmitting downlink control information intended for a certain terminal. That is, the base station transmits, in the CSS, a DCI format intended for a plurality of terminals and/or a DCI format intended for a certain terminal.

In addition, the USS is used for transmitting downlink control information intended for a certain terminal. That is, the USS is defined by resources dedicated to the certain terminal. That is, the USS is independently defined for each terminal. For example, the USS is configured by CCEs having numbers determined on the basis of a radio network temporary identifier (RNTI) assigned by the base station, a slot number in a radio frame, an aggregation level, or the like. Here, RNTIs include a C-RNTI (cell RNTI) and a temporary C-RNTI. That is, the base station transmits, in the USS, a DCI Format intended for a certain terminal.

Here, an RNTI assigned by the base station to the terminal is used for transmitting (transmission on the PDCCH) the downlink control information. More specifically, a CRC (cyclic redundancy check parity bits (also referred to simply as a CRC)) generated on the basis of the downlink control information (may be a DCI format, instead) are attached to the downlink control information and, after the attachment, the CRC parity bits are scrambled by the RNTI.

The terminal attempts to decode the downlink control information with accompanying the CRC parity bits scrambled by the RNTI and detects a PDCCH with which the CRC has been successful as a PDCCH intended therefor (also referred to as blind decoding). Here, the RNTI includes the C-RNTI and the temporary C-RNTI. That is, the terminal decodes the PDCCH with the CRC scrambled by the C-RNTI. In addition, the terminal decodes the PDCCH with the CRC scrambled by the temporary C-RNTI.

Here, the C-RNTI is a unique identification used for identifying an RRC (radio resource control) connection and scheduling. For example, the C-RNTI is used for dynamically scheduled unicast transmission.

In addition, the temporary C-RNTI is an identification used for the random access procedure. Here, the base station transmits the temporary C-RNTI while including the temporary C-RNTI in the random access response. For example, the temporary C-RNTI is used, in the random access procedure, for identifying a terminal that is performing the random access procedure. In addition, the temporary C-RNTI is used for a retransmission of the Message 3 in the random access procedure. That is, in order for the terminal to retransmit the Message 3, the base station transmits the downlink control information on the PDCCH with the CRC scrambled by the temporary C-RNTI. That is, the terminal changes its interpretation of the downlink control information on the basis of which RNTI has been used to scramble the CRC.

Here, for example, the terminal performs the random access procedure in order to synchronize with the base station in a time domain. In addition, the terminal performs the random access procedure in order to realize initial connection establishment. In addition, the terminal performs the random access procedure for a handover. In addition, the terminal performs the random access procedure in order to realize connection re-establishment. In addition, the terminal performs the random access procedure in order to request resources of the UL-SCH.

An example of the random access procedure will be described hereinafter.

The terminal obtains SIB2 (System Information Block Type 2) transmitted from the base station using the PDSCH. SIB2 is a configuration (information) common to all terminals (may be a plurality of terminals) in a cell. The common configuration includes a configuration of the PRACH.

The terminal randomly selects a random access preamble number. The terminal transmits the random access preamble (Message 1) having the selected number to the base station using the PRACH. The base station receives the random access preamble using the PRACH. The base station estimates an uplink transmission timing using the random access preamble. The base station transmits the random access response (Message 2) using the PDSCH. The random access response includes a plurality of pieces of information for the random access preamble detected by the base station. The plurality of pieces of information include the random access preamble number, the temporary C-RNTI, a TA command (timing advance command), and the random access response grant. The TA command is used for instructing the terminal to adjust the uplink transmission timing. If the random access response includes the transmitted random access preamble number, the terminal determines that the random access response is intended therefor.

The terminal adjusts the uplink transmission timing on the basis of the TA command included in the random access response. The terminal transmits the uplink data (the Message 3) using the PUSCH scheduled by the random access response grant. The uplink data includes an identifier (information indicating an initial UE identity or information indicating the C-RNTI) for identifying the terminal. If the C-RNTI has been set, the terminal transmits the uplink data while including the information indicating the C-RNTI in the uplink data. If the C-RNTI has not been set, the terminal transmits the uplink data while including the initial UE identity in the uplink data. If S-TMSI (system architecture evolution temporary mobile subscriber identity) has been provided, the terminal sets the S-TMSI as the initial UE identity. In addition, if S-TMSI has not been provided, the terminal randomly selects a value from a range of values of 0 to 240-1 and sets the selected value as the initial UE identity. The S-TMSI is an identifier used for identifying the terminal in a tracking area.

If the base station has failed to decode the Message 3, the base station can transmit, using PDCCH with the CRC scrambled by the temporary C-RNTI, downlink control information for instructing the terminal to retransmit the Message 3. Upon receiving, using the PDCCH with the CRC scrambled by the temporary-CRNTI, the downlink control information for instructing the terminal to retransmit the Message 3, the terminal retransmits Message 3. On the other hand, if the base station has failed to decode the Message 3, the base station can transmit a NACK using a PHICH (a physical hybrid-ARQ indicator channel). Upon receiving the NACK using the PHICH, the terminal retransmits the Message 3.

The base station can detect which terminal has transmitted the random access preamble and the Message 3 by successfully decoding the Message 3 and obtaining Message 3. That is, before successfully decoding the Message 3, the base station cannot detect which terminal has transmitted the random access preamble and the Message 3.

If the base station has received the initial UE identity, the base station transmits a contention resolution identity (Message 4) having the same value as the received initial UE identity to the terminal using the PDCCH. If the value of the received contention resolution identity and the value of the transmitted initial UE identity match, the terminal (1) determines that contention resolution of the random access preamble has been successful, (2) sets the value of the temporary C-RNTI to the C-RNTI, (3) discards the temporary C-RNTI, and (4) determines that the random access procedure has been successfully completed.

If the base station has received the information indicating the C-RNTI, the base station transmits downlink control information (Message 4) to the terminal using PDCCH with the CRC scrambled by the received C-RNTI. If the PDCCH with the CRC scrambled by the C-RNTI have been decoded, the terminal (1) determines that contention resolution of the random access preamble has been successful, (2) discards the temporary C-RNTI, and (3) determines that the random access procedure has been successfully completed.

If the resources of the PDSCH are scheduled by the downlink control information transmitted on the PDCCH, the terminal receives downlink data on the scheduled PDSCH. On the other hand, if the resources of the PUSCH are scheduled by the downlink control information transmitted on the PDCCH, the terminal transmits uplink data and/or uplink control information on the scheduled PUSCHs. Here, the first reference signals are multiplexed with the uplink data and/or the uplink control information transmitted on the PUSCH.

In addition, the base station and the terminal transmit and receive signals in the higher layer. For example, the base station and the terminal transmit and receive a radio resource control signal (also referred to as RRC signaling, RRC message, or RRC information) in the RRC layer (Layer 3). Here, in the RRC layer, a dedicated signal transmitted from the base station to a certain terminal will also be referred to as a dedicated signal. That is, the base station transmits a configuration (information) specific (unique) to the certain terminal using the dedicated signal.

In addition, the base station and the terminal transmit and receive a MAC control element in the MAC (media access control) layer (Layer 2). Here, the RRC signaling and/or the MAC control element will also be referred to as higher layer signaling.

An example of a method for generating a reference signal sequence $r^{(\alpha)}_{u,v}$ will be described hereinafter. Here, the reference signal sequence is used for generating a sequence of the first reference signal. For example, the reference signal sequence is defined by a cyclic shift of a base sequence $\bar{r}^{(\alpha)}_{u,v}$ according to Expression 1.

$$r_{u,v}^{(\alpha)}=e^{j\alpha n}\bar{r}_{u,v}(n),\ 0 \leq n \leq M_{SC}^{RS} \quad \text{[Math. 1]}$$

That is, the cyclic shift α is applied to the base sequence to generate the reference signal sequence. In addition, multiple reference signal sequences are defined from a single reference sequence through different values of the cyclic shift α. Here, $M_{SC}^{RS}$ denotes the length of the reference signal sequence, and, for example, $M_{SC}^{RS}=mN_{SC}^{RB}$. In addition, $N_{SC}^{RB}$ denotes the size of a resource block in a frequency domain and, for example, indicated by the number of subcarriers.

In addition, base sequences are divided into groups. That is, the base sequences are indicated by a group number (also referred to as a sequence group number) u and a base sequence number v in the corresponding group. For example, the base sequences are divided into thirty groups, and each group includes two base sequences. In addition, a sequence group hopping is applied to the thirty groups. In addition, a sequence hopping is applied to the two base sequences.

Here, the sequence group number u and the base sequence number v may change in time. In addition, the definition of the base sequence depends on the sequence length $M_{SC}^{RS}$, and, for example, the base sequence is given by Expression 2 if $M_{SC}^{RS} \geq 3N_{SC}^{RS}$.

$$\bar{r}_{u,v}(n)=x_q(n \bmod N_{ZC}^{RS}),\ 0 \leq n \leq M_{SC}^{MS} \quad \text{[Math. 2]}$$

Here, a q-th route Zadoff-Chu sequence $x_q(m)$ is defined by Expression 3.

$$x_q(m) = e^{-j\frac{\pi qm(m+1)}{N_{ZC}^{RS}}},\ 0 \leq m \leq N_{ZC}^{RS}-1 \quad \text{[Math. 3]}$$

Here, q is given by Expression 4.

$$q=\lfloor \bar{q}+\frac{1}{2} \rfloor + v \cdot (-1)^{\lfloor 2\bar{q} \rfloor}$$

$$\bar{q}=N_{ZC}^{RS} \cdot (u+1)/31 \quad \text{[Math. 4]}$$

Here, a length $N_{ZC}^{RS}$ of the Zadoff-Chu sequence is given by the largest prime number that satisfies $N_{ZC}^{RS} < M_{SC}^{RS}$.

In addition, the sequence group number u in slot $n_s$ is defined by a group hopping pattern $f_{gh}(n_s)$ and a sequence shift pattern $f_{ss}$ according to Expression 5.

$$u=(f_{gh}(n_s)+f_{ss}) \bmod 30 \quad \text{[Math. 5]}$$

Here, the base station can instruct the terminal to enable or disable the sequence group hopping (also referred to as simply a group hopping). If instructed by the base station to enable the sequence group hopping, the terminal performs hopping on the groups of the reference signal sequences in each slot. That is, the terminal determines whether to perform hopping on the groups of the reference signal sequences in each slot in accordance with enabling or disabling of the sequence group hopping.

Here, for example, the group hopping pattern $f_{gh}(n_s)$ is given by Expression 6.

$$f_{gh}(n_s) = \begin{cases} 0 & \text{if group hopping is disabled} \\ \left(\sum_{i=0}^{7} c(8n_s+i) \cdot 2^i\right) \bmod 30 & \text{if group hopping is enabled} \end{cases} \quad \text{[Math. 6]}$$

Here, a pseudo-random sequence c(i) is defined by Expression 7. For example, the pseudo-random sequence is defined by a Gold sequence having a length of 31 and given by Expression 7.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Math. 7]}$$

Here, for example, $N_c=1600$. In addition, a first m sequence $x_1$ is initialized by $x_1(0)=1$ and $x_1(n)=0$, where n=1, 2, . . . , and 30. In addition, a second m sequence $x_2$ is initialized by Expression 8.

$$c_{init}=\sum_{i=0}^{30} x_2(i) \cdot 2^i \quad \text{[Math. 8]}$$

Here, $c_{init}$ is defined by Expression 9. That is, the pseudo-random sequence of the group hopping pattern $f_{gh}(n_s)$ is initialized by Expression 9.

$$c_{init} = \left\lfloor \frac{N_{ID}^{cell}}{30} \right\rfloor \quad \text{[Math. 9]}$$

Here, a physical layer cell identity $N_{ID}^{cell}$ will be described later. In addition, a sequence shift pattern $f_{ss}^{PUSCH}$ for the PUSCH is given by Expression 10.

$$f_{ss}^{PUCCH}=N_{ID}^{cell} \bmod 30$$

$$f_{ss}^{PUSCH}=(f_{ss}^{PUCCH}+\Delta_{ss}) \bmod 30 \quad \text{[Math. 10]}$$

Here, a parameter $\Delta_{ss}$ will be described later.

In addition, the base sequence number v in the base sequence group in the slot $n_s$ is defined by Expression 11. Here, the sequence hopping may be applied only to a reference signal sequence having a reference signal length equal to or larger than $6N_{SC}^{RB}$. That is, the base sequence number v of the reference signal sequence having the reference signal length of smaller than $6N_{SC}^{RB}$ is given by v=0.

$$v = \begin{cases} c(n_s) & \text{if group hopping is disabled and} \\ & \text{sequence hopping is enabled} \\ 0 & \text{otherwise} \end{cases} \quad \text{[Math. 11]}$$

Here, the base station can instruct the terminal to enable or disable the sequence hopping. If instructed by the base station to enable the sequence hopping, the terminal performs hopping on the reference signal sequences in each group in each slot. That is, the terminal determines whether to perform hopping on the reference signal sequences in each slot in accordance with enabling or disabling of the sequence hopping.

Here, the pseudo-random sequence c(i) is defined by Expression 7 and Expression 8. In addition, $c_{init}$ is defined by Expression 12. That is, the pseudo-random sequence of the reference sequence number v is initialized by Expression 12.

$$c_{init} = \left\lfloor \frac{N_{ID}^{cell}}{30} \right\rfloor \cdot 2^5 + f_{ss}^{PUSCH} \qquad \text{[Math. 12]}$$

An example of a method for generating a sequence of the first reference signals will be described hereinafter. That is, a method for generating the demodulation reference signal for the PUSCH will be described. For example, a demodulation reference signal sequence $\gamma^{(\lambda)}{}_{PUSCH}(\cdot)$ for the PUSCH associated with layer $\lambda \in \{0, 1, \ldots, \upsilon-1\}$ is defined by Expression 13.

$$r_{PUSCH}^{(\lambda)}(m \cdot M_{SC}^{RS}+n)=w^{(\lambda)}(m)r_{u,v}^{(\alpha_\lambda)}(n) \qquad \text{[Math. 13]}$$

Here, $\upsilon$ denotes the number of transmission layers. In addition, for example, $\upsilon$ is indicated by m=0 or 1. In addition, $\upsilon$ is indicated by n=0, . . . , and $M_{SC}^{RS}-1$. In addition, $M_{SC}^{RS}=M_{SC}^{PUSCH}$. Here, $M_{SC}^{PUSCH}$ denotes a bandwidth scheduled by the base station for uplink transmission (transmission on the PUSCH) and, for example, is indicated by the number of subcarriers. Furthermore, $w^{(\lambda)}$(m) denotes an orthogonal sequence.

In addition, a cyclic shift $\alpha_\lambda$ in a slot $n_s$ is given by $\alpha_\lambda = 2\pi n_{cs,\lambda}$. Here, $n_{cs,\lambda}$ is expressed by Expression 14. That is, the cyclic shift applied to the first reference signal associated with the PUSCH is defined by Expression 14.

$$n_{cs,\lambda}=(n_{DMRS}^{(1)}+n_{DMRS,\lambda}^{(2)}+n_{PN}(n_s))\mod 12 \qquad \text{[Math. 14]}$$

Here, $n^{(1)}{}_{DMRS}$ is transmitted from the base station apparatus using the higher layer signal. In addition, $n^{(2)}{}_{DMRS,\lambda}$ is indicated by the base station apparatus using the DCI format. In addition, a quantity $n_{PN(ns)}$ is given by Expression 15.

$$n_{PN}(n_s)=\Sigma_{i=0}^{7}c(8N_{symb}^{UL} \cdot n_s+i) \cdot 2^i \qquad \text{[Math. 15]}$$

Here, the pseudo-random sequence c (i) is defined by Expression 7 and Expression 8. In addition, $c_{init}$ is defined by Expression 16. That is, the cyclic shift applied to the first reference signal associated with the PUSCH is initialized by Expression 16.

$$c_{init} = \left\lfloor \frac{N_{ID}^{cell}}{30} \right\rfloor \cdot 2^5 + f_{ss}^{PUSCH} \qquad \text{[Math. 16]}$$

Here, in the above expression, $N_{ID}^{cell}$ denotes the physical layer cell identity (also referred to as a physical layer cell identifier). That is, $N_{ID}^{cell}$ denotes identity specific (unique) to the cell (base station). That is, $N_{ID}^{cell}$ denotes a physical layer identity of the cell. For example, $N_{ID}^{cell}$ may be $N_{ID}^{cell}$ corresponding to the primary cell.

For example, the terminal can detect $N_{ID}^{cell}$ using synchronization signals. In addition, the terminal can obtain $N_{ID}^{cell}$ from information included in the higher layer signal (for example, a handover command) transmitted from the base station.

In addition, in the above expression, for example, the parameter $\Delta_{ss}$ is indicated by $\Delta_{ss} \in \{0, 1, \ldots, 29\}$. Here, the parameter $\Delta_{ss}$ is a parameter specific to the cell (base station). For example, the terminal can receive the parameter $\Delta_{ss}$ using SIB2 (System Information Block Type 2). Here, SIB2 is a configuration (information) common to all terminals (may be a plurality of terminals) in a cell. That is, the parameter $\Delta_{ss}$ is specified for the terminal using the information common to all the terminals in the cell.

Figure 5:
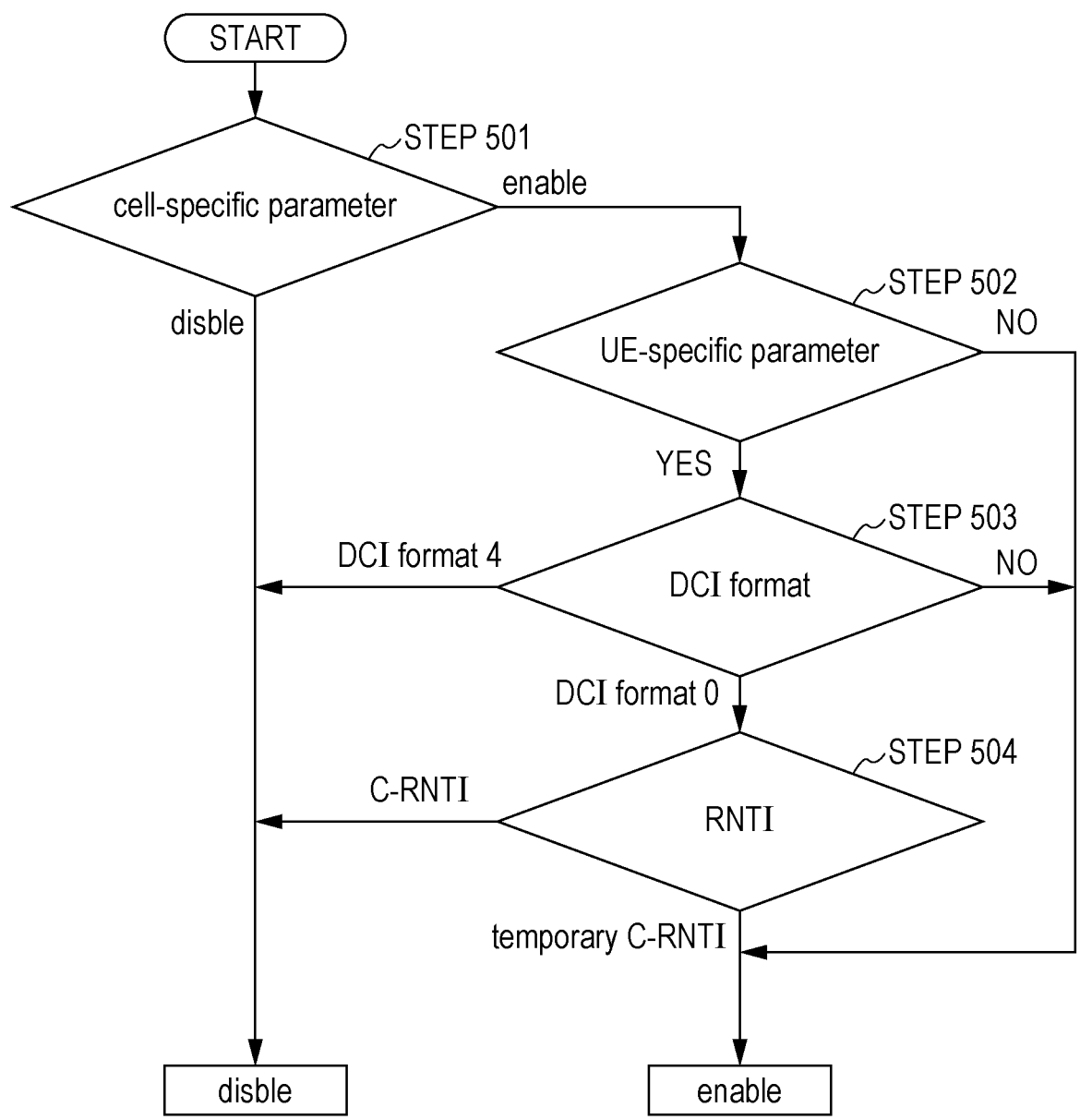
FIG. 5 is a flowchart illustrating the embodiment of the present invention.

FIG. 5 is a flowchart illustrating the embodiment. As described above, the base station can instruct the terminal to enable or disable the sequence group hopping of the reference signal sequence.

Here, as information for instructing the terminal to enable or disable the sequence group hopping, a first parameter (also referred to as group-hopping-enabled) may be used. That is, the first parameter is used for determining whether the sequence group hopping is enabled. In addition, as information for instructing the terminal to disable the sequence group hopping, a second parameter (also referred to as disable-sequence-hopping) may be used. That is, the second parameter is used for determining whether the sequence group hopping is disabled. Here, the second parameter cannot instruct the terminal to enable the sequence group hopping.

Here, the first parameter is configured in a cell-specific manner. For example, the first parameter is transmitted using SIB2 (System Information Block Type 2). Here, SIB2 is a configuration (information) common to all the terminals (may be a plurality of terminals) in the cell. That is, the first parameter is a cell-specific parameter. Here, the first parameter will also be described as a cell-specific parameter.

On the other hand, the second parameter is configured in a terminal-specific (UE-specific) manner. For example, the second parameter is configured using the dedicated signal. Alternatively, the second parameter may be indicated using downlink control information included in a DCI format. That is, the second parameter is a terminal-specific parameter (a UE-specific parameter). The second parameter will also be described as a UE-specific parameter hereinafter.

Here, for example, the base station can instruct the terminal to disable the sequence group hopping by transmitting the dedicated signal while including the second parameter in the dedicated signal. That is, the base station can instruct the terminal to disable the sequence group hopping by transmitting the second parameter to the terminal. If the dedicated signal includes the second parameter, the terminal disables the sequence group hopping.

In addition, even though the sequence group hopping is enabled using the first parameter, the base station can disable the sequence group hopping using the second parameter. That is, for example, the second parameter is used for disabling the sequence group hopping for a certain terminal even though the sequence group hopping is enabled in the cell-specific manner.

A method for determining whether to enable or disable the sequence group hopping by the terminal will be described with reference to FIG. 5. In FIG. 5, the terminal identifies the first parameter transmitted from the base station (step 501). Here, in a case that the disabling of the sequence group hopping is configured (disable), the terminal disables the sequence group hopping and generates the first reference signal. In addition, the terminal transmits the generated first reference signal.

In addition, in a case that it is determined as a result of the identification of the first parameter transmitted from the base station that the enabling of the sequence group hopping is configured (enable), the terminal identifies the second parameter. That is, for example, the terminal identifies whether the second parameter is configured (step 502). Here, in a case that the second parameter is not configured (for example, if the second parameter is not received using the dedicated signal) (NO), the terminal enables the sequence group hopping and generates the first reference signal. In addition, the terminal transmits the generated first reference signal.

Furthermore, in a case that the second parameter is configured (for example, in a case that the second parameter is received using the dedicated signal) (YES), the terminal identifies the DCI format (step 503). That is, the terminal identifies the DCI format used for scheduling of the corresponding PUSCH transmission.

Here, in a case that the DCI format is not identified (detected or received), the terminal enables the sequence group hopping and generates the first reference signal. In addition, the terminal transmits the generated first reference signal.

Here, in a case that the DCI Format 4 is identified (detected or received) (DCI FORMAT 4), the terminal disables the sequence group hopping and generates the first reference signal. In addition, the terminal transmits the generated first reference signal. Here, for example, the DCI Format 4 is transmitted only in the USS. That is, in a case that the DCI format transmitted only in the USS is identified, the terminal disables the sequence group hopping and generates the first reference signal.

On the other hand, in a case that the DCI Format 0 is identified (detected or received) (DCI FORMAT 0), the terminal identifies the RNTI by which the CRC is scrambled (step 504). Here, for example, the DCI Format 0 is transmitted in the CSS and/or the USS. That is, in a case that the DCI format that is possible to be transmitted in the CSS is identified, the terminal identifies the RNTI. The DCI Format 0 will also be described as a predetermined downlink information format hereinafter. In addition, the DCI Format 4 will also be described as a downlink information format other than the predetermined downlink information format.

Here, the DCI format received by the terminal refers to a DCI format including most recent uplink-related DCI for a transport block associated with the corresponding PUSCH transmission.

In addition, in the case that the DCI format is not received, the terminal does not receive any DCI format for the transport block associated with the corresponding PUSCH transmission. For example, in a case that an initial transmission of the transport block scheduled by the random access response grant is performed, there is no DCI format for the transport block transmitted using the PUSCH. In addition, in a case that the DCI format indicating a retransmission of the transport block is not received and the transport block is retransmitted in accordance with NACK received using the PHICH (the physical hybrid-ARQ indicator channel), there is no DCI format for the transport block transmitted using the PUSCH.

Here, the PHICH is a channel used for transmitting information indicating ACK/NACK (also referred to as ACK/NACK in HARQ) in response to uplink data. The base station transmits, using the PHICH, the information indicating ACK/NACK in response to the uplink data transmitted from the terminal.

In addition, in a case that the CRC is scrambled by the C-RNTI (C-RNTI), the terminal disables the sequence group hopping and generates the first reference signal. In addition, the terminal transmits the generated first reference signal. Here, in a case that the CRC is scrambled by the temporary C-RNTI (TEMPORARY C-RNTI), the terminal enables the sequence group hopping and generates the first reference signal. In addition, the terminal transmits the generated first reference signal.

Here, the RNTI by which the CRC is scrambled refers to RNTI used for transmitting the most recent uplink-related DCI for the transport block associated with the corresponding PUSCH transmission.

That is, the terminal can enable or disable the sequence group hopping on the basis of the cell-specific parameter, the terminal-specific parameter, the DCI format, and/or the RNTI.

That is, the terminal determines whether to follow the cell-specific parameter or the terminal-specific parameter on the basis of the DCI format and/or the RNTI by which the CRC is scrambled.

That is, even though the sequence group hopping is disabled in the terminal-specific manner, the first parameter may be used for enabling or disabling the sequence group hopping in a case that the PUSCH for the transport block is scheduled by the random access response grant and the uplink grant for the transport block is not received.

In addition, even though the sequence group hopping is disabled in the terminal-specific manner, the first parameter may be used for enabling or disabling the sequence group hopping in a case that the temporary C-RNTI is used for transmitting the most recent uplink-related DCI for the transport block associated with the corresponding PUSCH transmission.

That is, even though the sequence group hopping is disabled in the terminal-specific manner, the first parameter may be used for enabling or disabling the sequence group hopping in a case that a transmission of the Message 3 is performed.

In addition, even though the sequence group hopping is enabled in the cell-specific manner, the second parameter may be used for disabling the sequence group hopping for a certain terminal in a case that the C-RNTI is used for transmitting the most recent uplink-related DCI for the transport block associated with the corresponding PUSCH transmission. That is, the second parameter may be used for disabling the sequence group hopping for a certain terminal in a case that a transmission of the uplink data other than the Message 3 is performed.

In addition, the base station can instruct the terminal to enable or disable the sequence hopping of the reference signal sequences.

Here, as the information for instructing the terminal to enable or disable the sequence hopping, a third parameter (also referred to as sequence-hopping-enabled) may be used. That is, the third parameter is used for determining whether to enable the sequence hopping.

In addition, as the information for instructing the terminal to disable the sequence hopping, the above-described second parameter (disable-sequence-hopping) may be used. That is, the second parameter is used for determining whether to disable the sequence hopping. That is, the second parameter is used for determining whether to disable the sequence group hopping and the sequence hopping. Here, the second parameter cannot instruct the terminal to enable the sequence hopping. In addition, the sequence hopping can be enabled using the second parameter only if the sequence group hopping is disabled.

Here, the third parameter is configured in the cell-specific manner. For example, the third parameter is transmitted using SIB2 (System Information Block Type 2). That is, the third parameter is the cell-specific parameter.

Here, even though the sequence hopping is enabled using the third parameter, the base station can disable the sequence hopping using the second parameter. That is, the second parameter may be used for disabling the sequence hopping for a certain terminal even though the sequence hopping is enabled in the cell-specific manner.

A method for determining whether to enable or disable the sequence hopping using the terminal will be described with reference to FIG. 5. In FIG. 5, the terminal identifies the third parameter transmitted from the base station (step 501). Here, in a case that the disabling of the sequence group hopping is configured (disable), the terminal disables the sequence group hopping and generates the first reference signal. In addition, the terminal transmits the generated first reference signal.

In addition, in a case that it is determined as a result of the identification of the first parameter transmitted from the base station that the enabling of the sequence group hopping is configured (enable), the terminal identifies the second parameter. That is, for example, the terminal identifies whether the second parameter is configured (step 502). Here, in a case that the second parameter is not configured (for example, in a case that the second parameter is not received using the dedicated signal) (NO), the terminal enables the sequence hopping and generates the first reference signal. In addition, the terminal transmits the generated first reference signal.

Furthermore, in a case that the second parameter is configured (for example, in a case that the second parameter is received using dedicated signal) (YES), the terminal identifies the DCI format (step 503). That is, the terminal identifies the DCI format used for scheduling of the corresponding PUSCH transmission.

Here, in a case that the DCI format is not identified (detected or received), the terminal enables the sequence hopping and generates the first reference signal. In addition, the terminal transmits the generated first reference signal.

Here, in a case that the DCI Format 4 is identified (detected or received) (DCI FORMAT 4), the terminal disables the sequence hopping and generates the first reference signal. In addition, the terminal transmits the generated first reference signal. Here, for example, the DCI Format 4 is transmitted only in the USS. That is, in a case that the DCI format transmitted only in the USS is identified, the terminal disables the sequence hopping and generates the first reference signal.

On the other hand, in a case that the DCI Format 0 is identified (detected or received) (DCI FORMAT 0), the terminal identifies the RNTI by which the CRC is scrambled (step 504). Here, for example, the DCI Format 0 is transmitted in the CSS and/or the USS. That is, in a case that the DCI format that is possible to be transmitted in the CSS is identified, the terminal identifies the RNTI. Here, the DCI Format 0 will also be described as a predetermined downlink information format. In addition, the DCI Format 4 will also be described as a downlink information format other than the predetermined downlink information format.

Here, the DCI format received by the terminal refers to a DCI format including the most recent uplink-related DCI for the transport block associated with the corresponding PUSCH transmission.

In addition, in the case that the DCI format, the terminal does not receive any DCI format for the transport block associated with the corresponding PUSCH transmission. For example, in a case that an initial transmission of the transport block scheduled by the random access response grant is performed, there is no DCI format for the transport block transmitted using the PUSCH. In addition, in a case that the DCI format indicating a retransmission of the transport block is not received and the transport block is retransmitted in accordance with NACK received using PHICH, there is no DCI format for the transport block transmitted using the PUSCH.

In addition, in a case that the CRC is scrambled by the C-RNTI (C-RNTI), the terminal disables the sequence hopping and generates the first reference signal. In addition, the terminal transmits the generated first reference signal. Here, in a case that the CRC is scrambled by the temporary C-RNTI (TEMPORARY C-RNTI), the terminal enables the sequence hopping and generates the first reference signal. In addition, the terminal transmits the generated first reference signal.

Here, the RNTI by which the CRC is scrambled refers to RNTI used for transmitting the most recent uplink-related DCI for the transport block associated with the corresponding PUSCH transmission.

That is, the terminal can enable or disable the sequence group hopping on the basis of the cell-specific parameter, the terminal-specific parameter, the DCI format, and/or the RNTI.

That is, the terminal determines whether to follow the cell-specific parameter or the terminal-specific parameter on the basis of the DCI format and/or the RNTI by which the CRC is scrambled.

That is, even though the sequence hopping is disabled in the terminal-specific manner, the third parameter may be used for enabling or disabling the sequence hopping in a case that the PUSCH for the transport block is scheduled by the random access response grant and the uplink grant for the transport block is not received.

In addition, even though the sequence hopping is disabled in the terminal-specific manner, the third parameter may be used for enabling or disabling the sequence hopping in a case that the temporary C-RNTI is used for transmitting the most recent uplink-related DCI for the transport block associated with the corresponding PUSCH transmission.

That is, even though the sequence hopping is disabled in the terminal-specific manner, the third parameter may be used for enabling or disabling the sequence hopping in a case that a transmission of the Message 3 is performed.

In addition, even though the sequence hopping is enabled in the cell-specific manner, the second parameter may be used for disabling the sequence hopping for a certain terminal in a case that the C-RNTI is used for transmitting the most recent uplink-related DCI for the transport block associated with the corresponding PUSCH transmission. That is, the second parameter may be used for disabling the sequence hopping for a certain terminal in a case that a transmission of the uplink data other than the Message 3 is performed.

Using the above-described method, the terminal determines whether to enable or disable the sequence group hopping and the sequence hopping on the basis of the cell-specific first parameter and the cell-specific third parameter in the case that the Message 3 is to be transmitted. That is, even though the sequence group hopping and the sequence hopping are disabled by the terminal-specific second parameter, in case of transmitting the Message 3, the terminal determines whether to enable or disable the sequence group hopping and the second hopping on the basis of the cell-specific first parameter and the cell-specific third parameter.

In addition, in case of transmitting the uplink data other than the Message 3, the terminal determines whether the sequence group hopping and the sequence hopping are disabled on the basis of the terminal-specific second parameter. As a result, even though the base station does not identify which terminal has transmitted the Message 3, the base station can determine whether the terminal has disabled the sequence group hopping or the sequence hopping on the basis of the cell-specific first parameter and the cell-specific second parameter. Therefore, the base station can correctly receive Message 3.

The above-described method enables, for example, transmission and reception of the uplink reference signal while switching the sequences more elastically. In addition, the above-described method enables transmission and reception of the uplink reference signal while switching the sequences more dynamically.

When the base station switches the sequence group hopping and/or the sequence hopping in the above-described manner, it is possible to elastically control transmission of the uplink reference signals transmitted by a plurality of terminals.

Programs operating on a primary base station, a secondary base station, and a terminal according to the present invention are programs (programs that causes computers to function) that control CPUs or the like in such a way as to realize the functions of the above embodiment of the present invention. Information handled by these apparatuses is temporarily accumulated in RAMs during processing, and then stored in various ROMs or HDDs and read, corrected, and written by the CPUs as necessary. As recording media that store the programs, any of semiconductor media (for example, ROMs, nonvolatile memory cards, and the like), optical recording media (for example, DVDs, MOs, MDs, CDs, BDs, and the like), magnetic recording media (for example, magnetic tapes, flexible disks, and the like), and the like may be used. In addition, the functions of the above-described embodiment may be realized not only by executing the loaded programs but also by performing processing in combination with operating systems, other application programs, or the like on the basis of instructions from the programs.

In addition, when the programs are to be distributed to the market, the programs may be stored in portable recording media and distributed or transferred to a server computer connected through a network such as the Internet. In this case, a storage device of the server computer is also included in the present invention. Alternatively, part or all of the primary base station, the secondary base station, and the terminal in the above-described embodiment may be realized as LSI, which is typically integrated circuits. Here, each function block of the primary base station, the secondary base station, and the terminal may be individually realized as a chip, or part or all of the function blocks may be integrated and realized as a chip. In addition, a method for realizing the function blocks as integrated circuits is not limited to the LSI, but may be realized by dedicated circuits or general-purpose processors. In addition, if a technology for realizing the function blocks as integrated circuits that replaces the LSI has been developed as a result of the evolution of semiconductor technologies, integrated circuits realized by the technology may be used.

As described above, the embodiment may adopt the following modes. That is, a mobile station apparatus that communicates with a base station apparatus receives, from the base station apparatus, a cell-specific parameter and a user-equipment-specific parameter for indicating enabling or disabling of a sequence group hopping, and transmits, to the base station apparatus, a reference signal generated by enabling the sequence group hopping in a case that enabling is indicated by the cell-specific parameter, disabling is indicated by the user-equipment-specific parameter, and there is no downlink control information format for a transport block to be transmitted.

In addition, a mobile station apparatus that communicates with a base station apparatus receives, from the base station apparatus, a cell-specific parameter and a user-equipment-specific parameter for indicating enabling or disabling of a sequence group hopping, and transmits, to the base station apparatus, a reference signal generated by enabling the sequence hopping in a case that enabling is indicated by the cell-specific parameter, disabling is indicated by the user-equipment-specific parameter, and a predetermined downlink control information format with a CRC scrambled by a temporary C-RNTI is received.

In addition, a base station apparatus that communicates with a mobile station apparatus transmits, to the mobile station apparatus, a cell-specific parameter and a user-equipment-specific parameter for indicating enabling or disabling of a sequence group hopping, and receives, from the mobile station apparatus, a reference signal generated by enabling the sequence hopping in a case that enabling is indicated by the cell-specific parameter, disabling is indicated by the user-equipment-specific parameter, and there is no downlink control information format for a transport block to be transmitted by the mobile station apparatus.

In addition, a base station apparatus that communicates with a mobile station apparatus transmits, to the mobile station apparatus, a cell-specific parameter and a user-equipment-specific parameter for indicating enabling or disabling of a sequence group hopping, and receives, from the mobile station apparatus, a reference signal generated by enabling the sequence hopping in a case that enabling is indicated by the cell-specific parameter, disabling is indicated by the user-equipment-specific parameter, and a predetermined downlink control information format with a CRC scrambled by a temporary C-RNTI is transmitted.

In addition, in a communication method used by a mobile station apparatus that communicates with a base station apparatus, the mobile station apparatus receives, from the base station apparatus, a cell-specific parameter and a user-equipment-specific parameter for indicating enabling or disabling of a sequence group hopping, and transmits, to the base station apparatus, a reference signal generated by enabling the sequence group hopping in a case that enabling is indicated by the cell-specific parameter, disabling is indicated by the user-equipment-specific parameter, and there is no downlink control information format for a transport block to be transmitted.

In addition, in a communication method used by a mobile station apparatus that communicates with a base station apparatus, the mobile station apparatus receives, from the base station apparatus, a cell-specific parameter and a user-equipment-specific parameter for indicating enabling or disabling of a sequence group hopping, and transmits, to the base station apparatus, a reference signal by enabling the sequence group hopping in a case that enabling is indicated by the cell-specific parameter, disabling is indicated by the user-equipment-specific parameter, and a predetermined downlink control information format with a CRC scrambled by a temporary C-RNTI is received.

In addition, in a communication method used by a base station apparatus that communicates with a mobile station apparatus, the base station apparatus transmits, to the mobile station apparatus, a cell-specific parameter and a user-equipment-specific parameter for indicating enabling or disabling of a sequence group hopping, and receives, from the mobile station apparatus, a reference signal generated by enabling the sequence hopping in a case that enabling is indicated by the cell-specific parameter, disabling is indicated by the user-equipment-specific parameter, and there is no downlink control information format for a transport block to be transmitted by the mobile station apparatus.

In addition, in a communication method used by a base station apparatus that communicates with a mobile station apparatus, the base station apparatus transmits, to the mobile station apparatus, a cell-specific parameter and a userequipment-specific parameter for indicating enabling or disabling of a sequence group hopping, and receives, from the mobile station apparatus, a reference signal generated by enabling the sequence group hopping in a case that enabling is indicated by the cell-specific parameter, disabling is indicated by the user-equipment-specific parameter, and a predetermined downlink control information format with a CRC scrambled by a temporary C-RNTI is transmitted.

In addition, an integrated circuit mounted on a mobile station apparatus that communicates with a base station apparatus causes the mobile station apparatus to realize a function of receiving, from the base station apparatus, a cell-specific parameter and a user-equipment-specific parameter for indicating enabling or disabling of a sequence group hopping, and a function of transmitting, to the base station apparatus, a reference signal generated by enabling the sequence group hopping in a case that enabling is indicated by the cell-specific parameter, disabling is indicated by the user-equipment-specific parameter, and there is no downlink control information format for a transport block to be transmitted.

In addition, an integrated circuit mounted on a mobile station apparatus that communicates with a base station apparatus causes the mobile station apparatus to realize a function of receiving, from the base station apparatus, a cell-specific parameter and a user-equipment-specific parameter for indicating enabling or disabling of a sequence group hopping, and a function of transmitting, to the base station apparatus, a reference signal generated by enabling the sequence group hopping in a case that enabling is indicated by the cell-specific parameter, disabling is indicated by the user-equipment-specific parameter, and a predetermined downlink control information format with a CRC scrambled by a temporary C-RNTI is received.

In addition, an integrated circuit mounted on a base station apparatus that communicates with a mobile station apparatus causes the base station apparatus to realize a function of transmitting, to the base station apparatus, a cell-specific parameter and a user-equipment-specific parameter for indicating enabling or disabling of a sequence group hopping, and a function of receiving, from the mobile station apparatus, a reference signal generated by enabling the sequence group hopping in a case that enabling is indicated by the cell-specific parameter, disabling is indicated by the user-equipment-specific parameter, and there is no downlink control information format for a transport block to be transmitted by the mobile station apparatus.

In addition, an integrated circuit mounted on a base station apparatus that communicates with a mobile station apparatus causes the base station apparatus to realize a function of transmitting, to the mobile station apparatus, a cell-specific parameter and a user-equipment-specific parameter for indicating enabling or disabling of a sequence group hopping, and a function of receiving, from the mobile station apparatus, a reference signal generated by enabling the sequence group hopping in a case that enabling is indicated by the cell-specific parameter, disabling is indicated by the user-equipment-specific parameter, and a predetermined downlink control information format with a CRC scrambled by a temporary C-RNTI is transmitted.

In addition, in a radio communication system in which a base station apparatus and a mobile station apparatus communicate with each other, the base station apparatus transmits, to the mobile station apparatus, a cell-specific parameter and a user-equipment-specific parameter for indicating enabling or disabling of a sequence group hopping, the mobile station apparatus transmits, to the base station apparatus, a reference signal generated by enabling the sequence group hopping in a case that enabling is indicated by the cell-specific parameter, disabling is indicated by the user-equipment-specific parameter, and a predetermined downlink control information format with a CRC scrambled by a temporary C-RNTI is received.

Although the embodiment of the present invention has been described in detail with reference to the drawings, specific configurations are not limited to this embodiment, and design changes and the like that do not deviate from the scope of the present invention are also included. In addition, the present invention may be modified in various ways within the range defined in the claims, and embodiments obtained by appropriately combining technical means disclosed in different embodiments are also included in the technical scope of the present invention. In addition, configurations obtained by replacing elements that have been described in the embodiment and that produce the same advantageous effects are also included.

INDUSTRIAL APPLICABILITY

The present invention may be desirably applied to a mobile station apparatus, a base station apparatus, a communication method, a radio communication system, and an integrated circuit.

REFERENCE SIGNS LIST 100 base station
101 data control unit
102 transmission data modulation unit
103 radio unit
104 scheduling unit
105 channel estimation unit
106 reception data demodulation unit
107 data extraction unit
108 higher layer
109 antenna
200 terminal
201 data control unit
202 transmission data modulation unit
203 radio unit
204 scheduling unit
205 channel estimation unit
206 reception data demodulation unit
207 data extraction unit
208 higher layer
209 antenna
301 primary base station
302 secondary base station
303, 304 terminal
305, 306, 307, 308 uplink

The invention claimed is:
1. A user equipment comprising:
receiving circuitry configured to receive, from a base station apparatus, a first parameter used to enable or disable a sequence group hopping and a second parameter used to disable the sequence group hopping; and
transmitting circuitry configured to transmit, to the base station apparatus, a demodulation reference signal associated with transmission of a physical uplink shared channel, a sequence of the demodulation reference signal being generated based on whether the sequence group hopping is enabled or disabled, wherein for the transmission of the physical uplink shared channel except for a message 3 transmission, the sequence group hopping is disabled based on the second parameter, and the message 3 transmission is scheduled by using a random access response grant in a random access procedure.

2. The user equipment according to claim 1, wherein for the message 3 transmission, the sequence group hopping is enabled or disabled based on the first parameter.

3. The user equipment according to claim 1, wherein the transmission of the physical uplink shared channel except for the message 3 transmission is scheduled by using downlink control information to which cyclic redundancy check parity bits scrambled by a cell-radio network temporary identifier (C-RNTI) are attached.

4. The user equipment according to claim 1, wherein a repeat of the message 3 transmission is scheduled by using downlink control information to which cyclic redundancy check parity bits scrambled by a temporary cell-radio network temporary identifier (TC-RNTI) are attached, and for the repeat of the message 3 transmission, the sequence group hopping is enabled or disabled based on the first parameter.

5. A base station apparatus comprising:

transmitting circuitry configured to transmit, to a user equipment, a first parameter used to enable or disable a sequence group hopping and a second parameter used to disable the sequence group hopping; and receiving circuitry configured to receive, from the user equipment, a demodulation reference signal associated with transmission of a physical uplink shared channel, a sequence of the demodulation reference signal being generated based on whether the sequence group hopping is enabled or disabled, wherein for the reception of the physical uplink shared channel except for a message 3 reception, the sequence group hopping is disabled based on the second parameter, and the message 3 reception is scheduled by using a random access response grant in a random access procedure.

6. The base station apparatus according to claim 5, wherein for the message 3 reception, the sequence group hopping is enabled or disabled based on the first parameter.

7. The base station apparatus according to claim 5, wherein the reception of the physical uplink shared channel except for the message 3 reception is scheduled by using downlink control information to which cyclic redundancy check parity bits scrambled by a cell-radio network temporary identifier (C-RNTI) are attached.

8. The base station apparatus according to claim 5, wherein a repeat of the message 3 reception is scheduled by using downlink control information to which cyclic redundancy check parity bits scrambled by a temporary cell-radio network temporary identifier (TC-RNTI) are attached, and for the repeat of the message 3 reception, the sequence group hopping is enabled or disabled based on the first parameter.

9. A communication method of a user equipment comprising:

receiving, from a base station apparatus, a first parameter used to enable or disable a sequence group hopping and a second parameter used to disable the sequence group hopping;

transmitting, to the base station apparatus, a demodulation reference signal associated with transmission of a physical uplink shared channel, a sequence of the demodulation reference signal being generated based on whether the sequence group hopping is enabled or disabled, wherein for the transmission of the physical uplink shared channel except for a message 3 transmission, the sequence group hopping is disabled based on the second parameter, and the message 3 transmission is scheduled by using a random access response grant in a random access procedure.

10. The communication method according to claim 9, wherein for the message 3 transmission, the sequence group hopping is enabled or disabled based on the first parameter.

11. The communication method according to claim 9, wherein the transmission of the physical uplink shared channel except for the message 3 transmission is scheduled by using downlink control information to which cyclic redundancy check parity bits scrambled by a cell-radio network temporary identifier (C-RNTI) are attached.

12. The communication method according to claim 9, a repeat of the message 3 transmission is scheduled by using downlink control information to which cyclic redundancy check parity bits scrambled by a temporary cell-radio network temporary identifier (TC-RNTI) are attached, and for the repeat of the message 3 transmission, the sequence group hopping is enabled or disabled based on the first parameter.

13. A communication method of a base station apparatus comprising:

transmitting, to a user equipment, a first parameter used to enable or disable a sequence group hopping and a second parameter used to disable the sequence group hopping; and receiving, from the user equipment, a demodulation reference signal associated with transmission of a physical uplink shared channel, a sequence of the demodulation reference signal being generated based on whether the sequence group hopping is enabled or disabled, wherein for the reception of the physical uplink shared channel except for a message 3 reception, the sequence group hopping is disabled based on the second parameter, and the message 3 reception is scheduled by using a random access response grant in a random access procedure.

14. The communication method according to claim 13, wherein for the message 3 reception, the sequence group hopping is enabled or disabled based on the first parameter.

15. The communication method according to claim 13, wherein the reception of the physical uplink shared channel except for the message 3 reception is scheduled by using downlink control information to which cyclic redundancy check parity bits scrambled by a cell-radio network temporary identifier (C-RNTI) are attached.

16. The communication method according to claim 13, wherein a repeat of the message 3 reception is scheduled by using downlink control information to which cyclic redundancy check parity bits scrambled by a temporary cell-radio network temporary identifier (TC-RNTI) are attached, and
for the repeat of the message 3 reception, the sequence group hopping is enabled or disabled based on the first parameter.

\* \* \* \* \*